No. 781,774. Patented February 7, 1905.

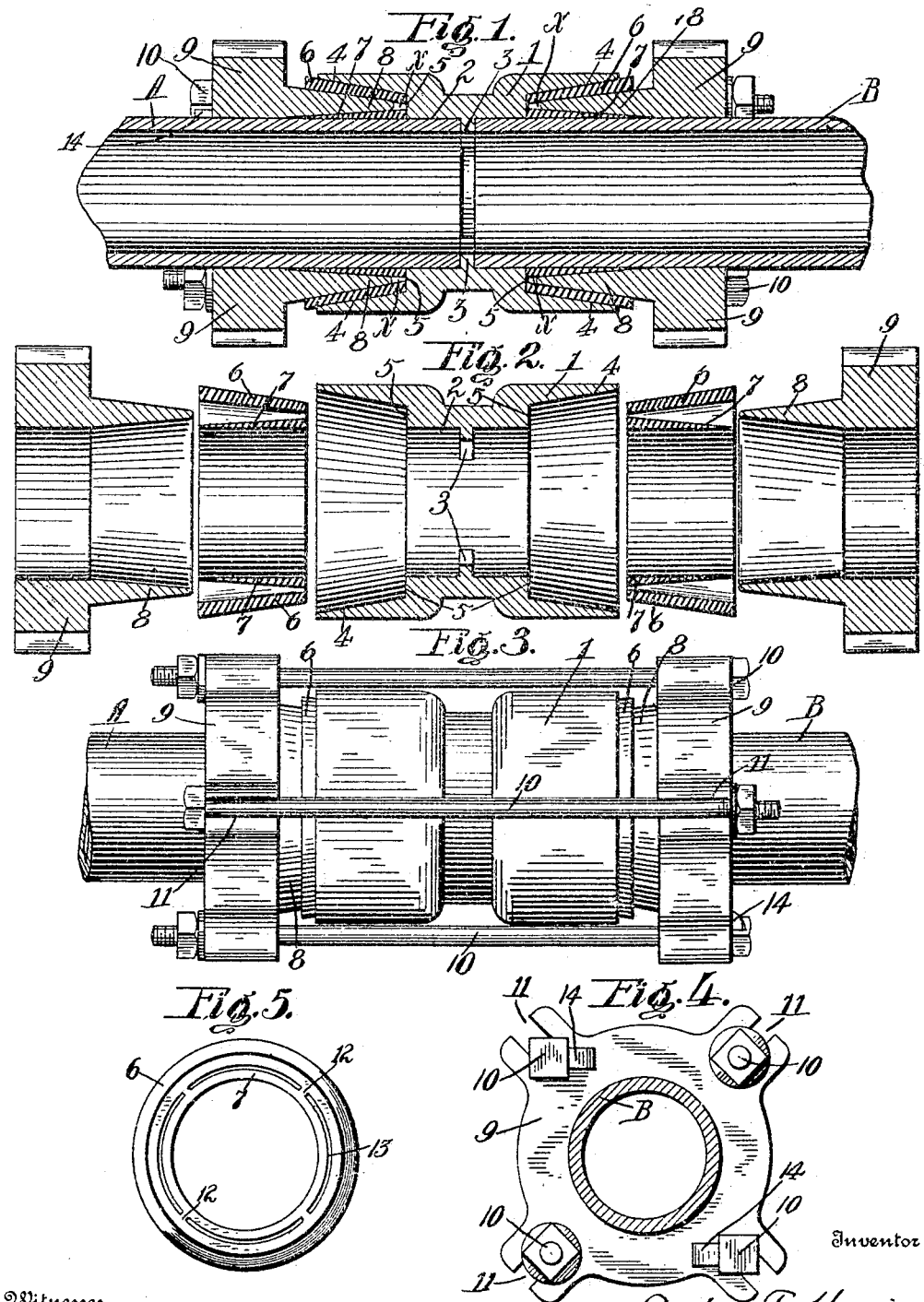

UNITED STATES PATENT OFFICE.

AUSTIN T. HERRICK, OF BRADFORD, PENNSYLVANIA.

PIPE-COUPLING.

SPECIFICATION forming part of Letters Patent No 781,774, dated February 7, 1905.

Application filed March 2, 1904. Serial No. 196,129.

*To all whom it may concern:*

Be it known that I, AUSTIN T. HERRICK, a citizen of the United States, residing at Bradford, in the county of McKean and State of Pennsylvania, have invented certain new and useful Improvements in Pipe-Couplings, of which the following is a specification.

My invention relates to that class of pipe-couplings embodying a sleeve into which the smooth ends of abutting pipes fit and wedging packings surrounding the pipes and entering the ends of the sleeve to clamp the pipes in position and prevent the leakage of gas or liquid therefrom.

My invention consists in certain novel features of construction, hereinafter fully described, and particularly pointed out in the claims, reference being had to the accompanying drawings, in which—

Figure 1 is a longitudinal section through a pipe-coupling embodying my invention. Fig. 2 is a similar sectional view of the same parts segregated. Fig. 3 is an elevation of the pipe-coupling. Fig. 4 is an end view of the same, the pipe being shown in section. Fig. 5 is an end view of one of the pairs of packing-rings.

1 represents a sleeve having a reduced diameter-tool into which the ends of pipes A B are fitted. Said sleeve may be provided with internal abutting flange 3 to center the sleeve upon the pipes. The ends of the sleeve 1 are formed with enlarged tapered bores 4, which are offset from the inner bore 2 by shoulders 5, and within these bores 4 are placed pairs of separate packing-rings 6 7, with a tapering space between them to receive the expanding-wedges 8 of adjustable collars 9, which are held together by bolts 10, dropped into radially-opening recesses 11 in said collars. When the collars 9 are drawn toward each other, their wedges force the pairs of packing-rings into intimate relation with the outer surface of the pipe and the inner surface of the enlarged bores 4 to securely pack the joint. The offsets 5 form such a joint with the pipes as to leave the smallest practicable surface of rubber exposed to the contents of the pipe, which makes the packing especially available for oil pipe-lines. By having the packing-rings separated into pairs, each pair consisting of an inner and outer ring, the drawing of the pipes outward under contraction seeks to draw the inner ring further onto the wedge, thus tightening the packing and the grip and avoiding loosening or impairing the tightness of the outer ring. For convenience these pairs of rings are connected by very small webs 12, as shown in Fig. 5, so that they may be placed in position easily; but these webs do not alter their character as being substantially independent packing-rings. The space 13 between these rings will admit pressure to the small chamber *x* (shown in Fig. 1) in case there is leakage, and the inwardly-projecting portions of these rings will then constitute expansion-lips to render the joint absolutely tight.

For convenience in applying the bolts 10 the collars 9 are provided at each alternate recess 11 with lugs 14, that engage the heads of the bolts 10 and prevent them turning while their nuts are being screwed up. The collars are arranged so that the lugs on opposite collars alternate in position, and the bolts are inserted alternately in opposite positions, so that a number of hands may work at both ends of the coupling simultaneously, and thus greatly facilitate and reduce the time of laying pipe-lines.

Having thus described my invention, what I claim is—

1. In a pipe-coupling, the combination of the sleeve having an intermediate diameter fitting the abutting ends of the pipes and larger tapered bores at its ends, pairs of washers introduced into the said larger bores, and expanding-wedges entering between the washers of each pair and forcing said washers respectively against the inner surface of the sleeve and the outer surface of the pipe.

2. In a pipe-coupling, the combination of the sleeve having an intermediate diameter fitting the abutting ends of the pipes to be connected and having larger tapered bores at its ends offset from the reduced intermediate diameter by shoulders, pairs of packing-rings inserted in said tapered bores and abutting said shoulders and expanding-wedges inserted between the rings of the respective pairs and having means for drawing them together.

3. In a pipe-joint, the combination of the sleeve into which the ends of the pipes fit, the packing-rings introduced into the ends of the said sleeve around the pipe, expanding-wedges for said rings and means for drawing said wedges inward consisting of adjusting-collars 9 having radially-opened recesses 11, bolts 10 introduced into said recesses and nuts on said bolts; said collars having lugs 14 adjacent to the recesses 11 to engage the heads of the bolts to prevent them turning.

4. As a new article of manufacture, a packing for wedging pipe-couplings of substantially the character described, said packing consisting of a pair of concentric rings with a tapering space between them and said rings being connected at points at one end to maintain their relation while being inserted, without interfering with their independent action when in place.

The foregoing specification signed this 1st day of March, 1904.

AUSTIN T. HERRICK.

In presence of—
EDWIN S. CLARKSON,
JNO. R. ADAMS.